(12) United States Patent
Barre et al.

(10) Patent No.: US 7,081,285 B1
(45) Date of Patent: Jul. 25, 2006

(54) POLYETHYLENE USEFUL FOR BLOWN FILMS AND BLOW MOLDING

(75) Inventors: Vincent Henri Barre, Jacksonville, FL (US); Tim Coffy, Houston, TX (US); Ben Hicks, Shoreacres, TX (US); Rodolfo Mier, Pasadena, TX (US); Jay Nguyen, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/119,265

(22) Filed: Apr. 29, 2005

(51) Int. Cl.
*B29D 22/00* (2006.01)
*C08F 210/02* (2006.01)

(52) U.S. Cl. .................. 428/35.2; 428/36.9; 526/348.2; 526/348.5; 526/348.6

(58) Field of Classification Search ............... 428/35.2, 428/36.9; 526/348.2, 348.5, 348.6
See application file for complete search history.

(56) References Cited

U.S. PATENT DOCUMENTS

| | | | |
|---|---|---|---|
| 4,271,060 A | 6/1981 | Hubby | 260/33.6 A |
| 4,543,399 A | 9/1985 | Jenkins, III et al. | 526/70 |
| 4,588,790 A | 5/1986 | Jenkins, III et al. | 526/70 |
| 4,794,096 A | 12/1988 | Ewen | 502/117 |
| 4,975,403 A | 12/1990 | Ewen | 502/113 |
| 5,001,205 A | 3/1991 | Hoel | 526/128 |
| 5,026,798 A | 6/1991 | Canich | 526/127 |
| 5,028,670 A | 7/1991 | Chinh et al. | 526/73 |
| 5,236,998 A | 8/1993 | Lundeen et al. | 525/52 |
| 5,317,036 A | 5/1994 | Brady, III et al. | 523/223 |
| 5,405,922 A | 4/1995 | DeChellis et al. | 526/68 |
| 5,436,304 A | 7/1995 | Griffin et al. | 526/68 |
| 5,456,471 A | 10/1995 | MacDonald | 273/195 A |
| 5,462,999 A | 10/1995 | Griffin et al. | 526/68 |
| 5,525,678 A | 6/1996 | Mink et al. | 525/246 |
| 5,589,555 A | 12/1996 | Zboril et al. | 526/64 |
| 5,616,661 A | 4/1997 | Eisinger et al. | 526/88 |
| 5,627,242 A | 5/1997 | Jacobsen et al. | 526/60 |
| 5,643,847 A | 7/1997 | Walzer, Jr. | 502/117 |
| 5,665,818 A | 9/1997 | Tilston et al. | 525/53 |
| 5,668,228 A | 9/1997 | Chinh et al. | 526/67 |
| 5,677,375 A | 10/1997 | Rifi et al. | 525/53 |
| 5,703,187 A | 12/1997 | Timmers | 526/282 |
| 5,747,406 A | 5/1998 | Reichle et al. | 502/117 |
| 5,849,852 A | 12/1998 | Koch et al. | 526/96 |
| 5,859,653 A | 1/1999 | Aoki et al. | 347/8 |
| 5,869,723 A | 2/1999 | Hinokuma et al. | 556/402 |
| 6,069,213 A | 5/2000 | Nemzek et al. | 526/113 |
| 6,147,173 A | 11/2000 | Holtcamp | 526/133 |
| 6,180,732 B1 | 1/2001 | Ewen | 526/127 |
| 6,180,735 B1 | 1/2001 | Wenzel | 526/142 |
| 6,359,072 B1 | 1/2001 | Ewen | 526/127 |
| 6,194,533 B1 * | 2/2001 | Nishimura et al. | 526/348.1 |
| 6,207,606 B1 | 3/2001 | Lue et al. | 502/113 |
| 6,211,105 B1 | 4/2001 | Holtcamp | 502/103 |
| 6,242,545 B1 | 6/2001 | Jejelowo et al. | 526/160 |
| 6,245,705 B1 | 6/2001 | Kissin | 502/117 |
| 6,245,868 B1 | 6/2001 | Agapiou et al. | 526/88 |
| 6,248,845 B1 | 6/2001 | Loveday et al. | 526/113 |
| 6,271,323 B1 | 8/2001 | Loveday et al. | 526/161 |
| 6,274,684 B1 | 8/2001 | Loveday et al. | 526/114 |
| 6,300,436 B1 | 10/2001 | Agapiou et al. | 526/154 |
| 6,339,134 B1 | 1/2002 | Crowther et al. | 526/128 |
| 6,340,730 B1 | 1/2002 | Murray et al. | 526/114 |
| 6,346,586 B1 | 2/2002 | Agapiou et al. | 526/160 |
| 6,380,328 B1 | 4/2002 | McConville et al. | 526/119 |
| 6,420,580 B1 | 7/2002 | Holtcamp et al. | 556/11 |
| 6,777,366 B1 | 8/2004 | Gauthier et al. | 502/117 |
| 6,777,367 B1 | 8/2004 | Gauthier et al. | 502/117 |

FOREIGN PATENT DOCUMENTS

| | | |
|---|---|---|
| EP | 0634421 | 1/1995 |
| EP | 0794200 | 9/1997 |
| EP | 0856525 | 8/1998 |
| WO | WO9807515 | 2/1998 |
| WO | WO9832775 | 7/1998 |

OTHER PUBLICATIONS

Chen et al.; *Cocatalysts for Metal-Catalyzed Olefin Polymerization: Activators, Activation Processes, and Structure-Activity Relationships*, Chem. Rev. 2000, vol. 100, No. 4, pp. 1391-1434, 28 Figs.

Gregory G. Hlatky, *Heterogeneous Single-Site Catalyzed for Olefin Polymerization*, Chem. Rev. 2000, vol. 100, No. 4, pp. 1347-1376, 9 Tables.

* cited by examiner

Primary Examiner—Fred Teskin
(74) Attorney, Agent, or Firm—Madan, Mossman & Sriram PC; Tenley R. Krueger

(57) ABSTRACT

Blown films and blow molded objects may be prepared using a polyethylene composition comprising a unimodal metallocene catalyzed polyethylene copolymer. The polyethylene copolymer has high melt fow rate and good melt strength allowing it to be useful in both extrusion and injection blow molding. Blown film prepared therewith has a high level of clarity.

19 Claims, 4 Drawing Sheets

Molecular Weight Distribution as Obtained by GPC

Complex Viscosity at 230°C

Extrusion Pressure of M3302 as Compared to M3410 EP.

POLYETHYLENE USEFUL FOR BLOWN FILMS AND BLOW MOLDING

BACKGROUND OF THE INVENTION

1. Technical Field

This invention relates to polyethylene and more particularly to polyethylene that is predominantly useful for preparing blown films and for blow molding applications.

2. Background of the Art

Polyethylene polymers are finding increasing numbers of applications in the thermoplastics industry. These polymers offer relatively good strength and other performance properties when used in applications such as, for example, films and blow molding applications such as for preparation of bottles and the like. For these applications the polyethylene is desirably processable over a wide variety of processing conditions. It is also desirable that processing be enabled for a variety of types of processing equipment. Finally, it is desirable that the final polyethylene product exhibits good physical properties and commercially desirable appearance.

Unfortunately, some conventional Ziegler-Natta catalyzed polyethylene polymers exhibit less than desirable processability and/or produce products with undesirable, or less desirable, physical properties. Such is particularly true in the case of blow molded products and blown films, where final physical properties must often be compromised in order to obtain a polyethylene that meets the rigors of processing in these applications.

Accordingly, it would be desirable in the art to identify a group of polyethylene polymers having particularly desirable processability characteristics without requiring an undesirable compromise in physical properties.

SUMMARY OF THE INVENTION

In one aspect, the invention is an article of manufacture that is or includes or incorporates a blown film or a blow molded object prepared using a polyethylene copolymer having a unimodal molecular weight distribution, prepared using a metallocene catalyst and having a MI2 of from about 0.12 to 0.50 dg/min, a polydispersity of at least 3, and a density of from about 0.9318 to about 0.9338 g/cc.

In another aspect, the invention is a blow molded object prepared using a polyethylene copolymer having a unimodal molecular weight distribution, prepared using a metallocene catalyst and having a MI2 of from about 0.10 to 0.50 dg/min, a polydispersity of at least 2.5, and a density of from about 0.930 to about 0.934 g/cc; wherein the object is a bottle, jar, or container.

In sill another aspect, the invention is an object comprising a blown film prepared using a polyethylene copolymer having a unimodal molecular weight distribution, prepared using a metallocene catalyst and having a MI2 of from about 0.10 to 0.50 dg/min, a polydispersity of at least 2.5, and a density of from about 0.930 to about 0.934 g/cc; wherein the object is a bread bag, apparel bag, or produce bag.

BRIEF DESCRIPTION OF THE FIGURES

For a detailed understanding and better appreciation of the invention, reference should be made to the following detailed description of the invention taken in conjunction with the accompanying drawings, wherein.

DETAILED DESCRIPTION OF THE INVENTION

Figure 1:
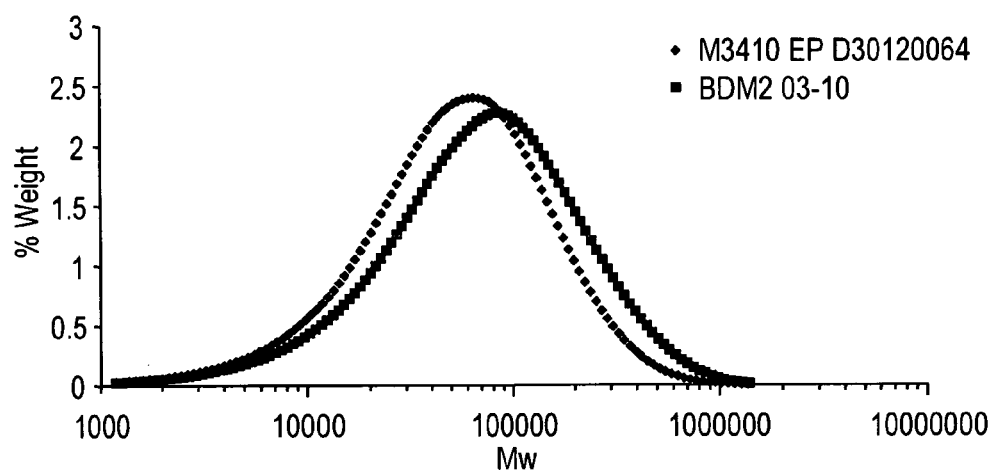
FIG. 1 is a plot of Molecular Weight Distribution.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology. Various terms as used herein are shown below. To the extent a term used in a claim is not defined below, it should be given the broadest definition persons in the pertinent art have given that term as reflected in printed publications and issued patents.

In recent years, metallocene catalysts have been employed for producing stereospecific polymers. Metallocene catalysts are generally characterized as having two cyclopentadienyl rings attached to a transition metal, such as zirconium, titanium or hafnium. In particular, chiral, stereorigid metallocene catalysts have been found especially useful in polymerizing highly isotactic polyolefins. A chiral compound is one that is non-superimposable on its mirror image. Examples of such catalysts for producing isotactic polyolefins are disclosed in, for example, U.S. Pat. Nos. 4,794,096 and 4,975,403, and published European patent application EP 0856525, each of which is incorporated herein by reference.

It has been found that desirable polyethylene homopolymer resins may be produced using metallocene catalysts. Such resins may be used in preparing blown films and blow molded articles wherein they exhibit certain desirable properties. As used herein, unless otherwise specified, the term "polyethylene" or "polyethylene homopolymers" means polyethylene homopolymers containing less than about 0.01 percent, by weight of polymer, of any comonomer, such as hexene and butene. The metallocene catalyst systems described herein may, in some embodiments, be high activity metallocene catalyst systems, e.g., catalyst systems having an activity of 500 g polyolefin produced/(gcat*hr) or more, or an efficiency of 2500 or more, or an efficiency of 5000 or more.

Metallocene catalysts may be characterized generally as coordination compounds incorporating one or more cyclopentadienyl (Cp) groups (which may be substituted or unsubstituted, each substitution being the same or different) coordinated with a transition metal through n bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound, as described throughout the specification and claims, may be selected from Groups 3 through 12 atoms and lanthanide Group atoms in one embodiment, selected from Groups 3 through 10 atoms in a more particular embodiment, selected from Sc, Ti, Zr, Hf, V, Nb, Ta, Mn, Re, Fe, Ru, Os, Co, Rh, Ir, and Ni in yet a more particular embodiment; selected from Groups 4, 5 and 6 atoms in yet a more particular embodiment, Ti, Zr, Hf atoms in yet a more particular embodiment and Zr in yet a more particular embodiment. The oxidation state of the metal atom "M" may range from 0 to +7 in one embodiment, and in a more particular embodiment, is +1, +2, +3, +4 or +5 and in yet a more particular embodiment is +2, +3 or +4. The groups bound to the metal atom "M" are such that the compounds described below in the formulas and structures are electrically neutral, unless otherwise indicated.

The bulky ligand "L" generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

The Cp group may include ring fused ring(s) and/or substituted ring or fused ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H₄Ind"), substituted versions thereof and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, iso-propyl, and the like. Other possible radicals include substituted alkyls and aryls, optionally containing halogens such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like, halocarbyl-substituted organometalloid radicals including tris(trifluoromethyl)silyl, methylbis(difluoromethyl)silyl, bromomethyldimethylgermyl and the like, disubstituted boron radicals including dimethylboron for example, disubstituted Group 15 radicals including dimethylamine, dimethylphosphine, diphenylamine, methylphenylphosphine and Group 16 radicals including methoxy, ethoxy, propoxy, phenoxy, methylsulfide and ethylsulfide. Other substituents "R" include olefins, such as, but not limited to, olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from carbon, nitrogen, oxygen, phosphorous, silicon, germanium, aluminum, boron and combinations thereof. Also, a substituent group R group, such as 1-butanyl, may form a bonding association to the transition metal.

Each anionic leaving group "A" is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment, hydride, chloride, fluoride, methyl, phenyl, phenoxy, benzoxy, tosyl, fluoromethyls and fluorophenyls in yet a more particular embodiment, $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment, chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment, fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

In one embodiment, L and A are bridged to one another. Alternatively, when m is greater than 1, two or more ligands may be bridged to one another. A bridged metallocene, for example may, be described by the general formula:

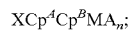

where X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups "X" include divalent hydrocarbon groups containing at least one Group 13 to 16 atom, such as, but not limited to, at least one carbon, oxygen, nitrogen, silicon, aluminum, boron, germanium or tin atom or combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging groups are represented by $C_1$ to $C_6$ alkylenes, substituted $C_1$ to $C_6$ alkylenes, oxygen, sulfur, $R_2C=$, $R_2Si=$, $—Si(R)_2Si(R_2)—$, $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms and halogen radicals and wherein two or more Rs may be joined to form a ring or ring system. In one embodiment, the bridged metallocene catalyst component has two or more atoms in the bridging group.

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom, dimethylsilyl, diethylsilyl, dimethylgermyl and/or diethylgermyl. The bridging groups may also include carbons or silicons having an olefinic substituent.

In another embodiment, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, and in a particular embodiment, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from hydrocarbyls (e.g., alkyl such as methyl) and halogens (e.g., F, Cl) in one embodiment. The one or more Cp groups to which the above cyclic bridging moieties may optionally be fused may be saturated or unsaturated and are selected from the group of those having 4 to 10 ring members, more particularly 5, 6 or 7 ring members (selected from the group of C, N, O and S in a particular embodiment), such as, for example, cyclopentyl, cyclohexyl and phenyl. Moreover, these ring structures may themselves be fused, such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

In one embodiment, the catalyst compound is a CpFlu type catalyst (e.g., a metallocene catalyst incorporating a substituted Cp fluorenyl ligand structure) represented by the following formula:

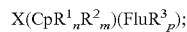

where Cp is a cyclopentadienyl group, Fl is a fluorenyl group, X is a structural bridge between Cp and Fl, $R^1$ is a substituent on the Cp, n is 1 or 2, $R^2$ is a substituent on the Cp at a position which is proximal to the bridge, m is 1 or 2, each $R^3$ is the same or different and is a hydrogen or a hydrocarbyl group having from 1 to 20 carbon atoms with $R^3$ being substituted on a nonproximal position on the fluorenyl group and at least one other $R^3$ being substituted at an opposed nonproximal position on the fluorenyl group and p is 2 or 4.

In yet another embodiment, the catalyst compound is a bridged mono-ligand metallocene compounds (e.g., mono cyclopentadienyl catalyst components). In this embodiment, the at least one metallocene catalyst component is a bridged "half-sandwich" metallocene catalyst. In yet another aspect of the invention, the at least one metallocene catalyst component is an unbridged "half sandwich" metallocene.

Described another way, the "half sandwich" metallocenes above are described in U.S. Pat. No. 6,069,213, U.S. Pat. No. 5,026,798, U.S. Pat. No. 5,703,187, U.S. Pat. No. 5,747,406, U.S. Pat. No. 5,026,798 and U.S. Pat. No. 6,069,213, which are incorporated by reference herein.

Non-limiting examples of metallocene catalyst components include:
cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$,
(2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyl)(fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$,
dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$, diphenylmethylidene(cyclopentadienyl)(9-fluorenyl)zirconium$A_n$,
diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
mesoethylenebis(1-indenyl)zirconium$A_n$,
ethylenebis(1-indenyl)zirconium$A_n$,
ethylenebis(2-methyl-1-indenyl)zirconium$A_n$,
ethylenebis(2-methyl-4,5,6,7-tetrahydro-1-indenyl)zirconium$A_n$,
ethylenebis(2-propyl-4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$,
ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$,
dimethylsilylbis(2-propylindenyl)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$,
dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyl(cyclopentadienyl)(9-fluorenyl)zirconium$A_n$,
diphenylsilyl(cyclopentadienyl)(9-fluorenyl)zirconium$A_n$,
diphenylsilylbisindenylzirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$,
cyclotrimethylenesilyl(tetramethylcyclopentadienyl)(2-methylindenyl)zirconium$A_n$,
cyclotrimethylenesilyl(tetramethylcyclopentadienyl)(3-methylcyclopentadienyl)zirconium$A_n$,
cyclotrimethylenesilylbis(2-methylindenyl)zirconium$A_n$,
cyclotrimethylenesilyl(tetramethylcyclopentadienyl)(2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentadienyl)zirconium$A_n$,
bis(n-dodecylcyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bisnoxtylcyclopentadienylzirconium$A_n$,
bis(n-pentylcyclopentadienyl)zirconium$A_n$,
bis(n-propylcyclopentadienyl)zirconium$A_n$,
bistrimethylsilylcyclopentadienylzirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$,
bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyl)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilylethyl)cyclopentadienyl]hafnium$A_n$,
bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethylcyclopentadienylcyclobutylamidotitanium$A_n$,
dimethylsilyltetramethylcyclopentadienylcyclopentylamidotitanium$A_n$,
dimethylsilyltetramethylcyclopentadienylcyclohexylamidotitanium$A_n$,
dimethylsilyltetramethylcyclopentadienylcycloheptylamidotitanium$A_n$,
dimethylsilyltetramethylcyclopentadienylcyclooctylamidotitanium$A_n$,
dimethylsilyltetramethylcyclopentadienylcyclononylamidotitanium$A_n$,
dimethylsilyltetramethylcyclopentadienylcyclodecylamidotitanium$A_n$,
dimethylsilyltetramethylcyclopentadienylcycloundecylamidotitanium$A_n$,
dimethylsilyltetramethylcyclopentadienylcyclododecylamidotitanium$A_n$,
dimethylsilyltetramethylcyclopentadienyl(sec-butylamido)titanium$A_n$,
dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methylphenylsilyltetramethylcyclopentadienylcyclobutylamidotitanium$A_n$,
methylphenylsilyltetramethylcyclopentadienylcyclopentylamidotitanium$A_n$,
methylphenylsilyltetramethylcyclopentadienylcyclohexylamidotitanium$A_n$, methylphenylsilyltetramethyl-
cyclopentadienylcycloheptylamidotitaniumA$_n$,
methylphenylsilyltetramethyl-
cyclopentadienylcyclooctylamidotitaniumA$_n$,
methylphenylsilyltetramethyl-
cyclopentadienylcyclononylamidotitaniumA$_n$,
methylphenylsilyltetramethyl-
cyclopentadienylcyclodecylamidotitaniumA$_n$,
methylphenylsilyltetramethyl-
cyclopentadienylcycloundecylamidotitaniumA$_n$,
methylphenylsilyltetramethyl-
cyclopentadienylcyclododecylamidotitaniumA$_n$,
methylphenylsilyl(tetramethylcyclopentadienyl)(sec-butylamido)titaniumA$_n$,
methylphenylsilyl(tetramethylcyclopentadienyl)(n-octylamido)titaniumA$_n$,
methylphenylsilyl(tetramethylcyclopentadienyl)(n-decylamido)titaniumA$_n$,
methylphenylsilyl(tetramethylcyclopentadienyl)(n-octadecylamido)titaniumA$_n$,
diphenylsilyltetramethylcyclopentadienylcyclopropylamidotitaniumA$_n$,
diphenylsilyltetramethylcyclopentadienylcyclobutylamidotitaniumA$_n$,
diphenylsilyltetramethylcyclopentadienylcyclopentylamidotitaniumA$_n$,
diphenylsilyltetramethylcyclopentadienylcyclohexylamidotitaniumA$_n$,
diphenylsilyltetramethylcyclopentadienylcycloheptylamidotitaniumA$_n$,
diphenylsilyltetramethylcyclopentadienylcyclooctylamidotitaniumA$_n$,
diphenylsilyltetramethylcyclopentadienyicyclononylamidotitaniumA$_n$,
diphenylsilyltetramethylcyclopentadienylcyclodecylamidotitaniumA$_n$,
diphenylsilyltetramethylcyclopentadienylcycloundecylamidotitaniumA$_n$,
diphenylsilyltetramethylcyclopentadienylcyclododecylamidotitaniumA$_n$,
diphenylsilyl(tetramethylcyclopentadienyl)(sec-butylamido)titaniumA$_n$,
diphenylsilyl(tetramethylcyclopentadienyl)(n-octylamido)titaniumA$_n$,
diphenylsilyl(tetramethylcyclopentadienyl)(n-decylamido)titaniumA$_n$,
diphenylsilyl(tetramethylcyclopentadienyl)(n-octadecylamido)titaniumA$_n$,
and derivatives thereof.

As used herein, the term "activator" is defined to be any compound or combination of compounds, supported or unsupported, which may activate a single-site catalyst compound (e.g., metallocenes, Group 15 containing catalysts, etc.) Typically, this involves the abstraction of at least one leaving group "A" in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"). Alternately, the activator is an "ionizing activator" or "stoichiometric activator", or any other compound that may convert a neutral metallocene catalyst component to a metallocene cation that is active with respect to olefin polymerization.

More particularly, it is within the scope of this invention to use Lewis acids such as aluminoxanes as activators. Aluminoxanes are well known in the art and can be made by conventional methods, such as, for example admixing an aluminum alkyl with water. Nonhydrolytic routes to form these materials are also known Non-limiting examples of aluminoxanes include methylaluminoxane (MAO), hexaisobutylalumoxane (HIBAO), isobutylaluminoxane, ethylaluminoxane, butylaluminoxane, heptylaluminoxane, methylbutylaluminoxane and combinations thereof. Modified aluminoxanes (e.g., "MMAO" and "TIBAO") may also be used. Ionizing activators are well known in the art and are described by, for example, *Eugene You-Xian Chen & Tobin J. Marks, Cocatalysts for Metal-Catalyzed Olefin Polymerization: Activators, Activation Processes, and Structure-Activity Relationships* 100(4) CHEMICAL REVIEWS 1391–1434 (2000). Examples of neutral ionizing activators include Group 13 tri-substituted compounds, in particular, tri-substituted boron, tellurium, aluminum, gallium and indium compounds and mixtures thereof (e.g., tri(n-butyl) ammonium tetrakis(pentafluorophenyl)boron and/or trisperfluorophenyl boron metalloid precursors). The three substituent groups are each independently selected from alkyls, alkenyls, halogens, substituted alkyls, aryls, arylhalides, alkoxys and halides. In one embodiment, the three groups are independently selected from the group of halogens, mono or multicyclic (including halosubstituted) aryls, alkyls, alkenyl compounds and mixtures thereof. In another embodiment, the three groups are selected from alkenyl groups having from 1 to 20 carbon atoms, alkyl groups having from 1 to 20 carbon atoms, alkoxy groups having from 1 to 20 carbon atoms, aryl groups having from 3 to 20 carbon atoms (including substituted aryls) and combinations thereof. In yet another embodiment, the three groups are selected from alkyls having from 1 to 4 carbon groups, phenyl, naphthyl and mixtures thereof. In yet another embodiment, the three groups are selected from highly halogenated alkyls having from 1 to 4 carbon groups, highly halogenated phenyls, highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, such as highly fluorided phenyl and highly fluorided naphthyl groups.

Illustrative, not limiting examples of ionic ionizing activators include:
trialkyl-substituted ammonium salts, such as:
triethylammoniumtetraphenylboron,
tripropylammoniumtetraphenylboron,
tri(n-butyl)ammoniumtetraphenylboron,
trimethylammoniumtetra(p-tolyl)boron,
trimethylammoniumtetra(o-tolyl)boron,
tributylammoniumtetra(pentafluorophenyl)boron,
tripropylammoniumtetra(o,p-dimethylphenyl)boron,
tributylammoniumtetra(m,m-dimethylphenyl)boron,
tributylammoniumtetra(p-tri-fluoromethylphenyl)boron,
tributylammoniumtetra(pentafluorophenyl)boron,
tri(n-butyl)ammoniumtetra(o-tolyl)boron and the like,
N,N-dialkylanilinium salts, such as:
N,N-dimethylaniliniumtetraphenylboron,
N,N-diethylaniliniumtetraphenylboron,
N,N-2,4,6-pentamethylaniliniumtetraphenylboron and the like,
dialkyl ammonium salts, such as:
diisopropylammoniumtetrapentafluorophenylboron, dicyclohexylammoniumtetraphenylboron and the like, triaryl phosphonium salts, such as: triphenylphosphoniumtetraphenylboron, trimethylphenylphosphoniumtetraphenylboron, tridimethylphenylphosphoniumtetraphenylboron and the like and their aluminum equivalents.

In yet another embodiment, an alkylaluminum may be used in conjunction with a heterocyclic compound. The ring of the heterocyclic compound may include at least one nitrogen, oxygen, and/or sulfur atom and includes at least one nitrogen atom in one embodiment. The heterocyclic compound includes 4 or more ring members in one embodiment and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example, tertiary butyl, isopropyl and the like. Other examples of substituents include fluoromethyl, fluoroethyl, difluoroethyl, iodopropyl, bromohexyl and chlorobenzyl.

In one embodiment, the heterocyclic compound is unsubstituted. In another embodiment, one or more positions on the heterocyclic compound are substituted with a halogen atom or a halogen atom containing group, for example a halogenated aryl group. In one embodiment, the halogen is selected from chlorine, bromine and fluorine, selected from fluorine and bromine in another embodiment and the halogen is fluorine in yet another embodiment.

Non-limiting examples of heterocyclic compounds include substituted and unsubstituted pyrroles, imidazoles, pyrazoles, pyrrolines, pyrrolidines, purines, carbazoles, indoles, phenyl indoles, 2,5,-dimethylpyrroles, 3-pentafluorophenylpyrrole, 4,5,6,7-tetrafluoroindole and 3,4-difluoropyrroles.

Other activators include those described in WO 98/07515, such as tris (2, 2', 2"-nonafluorobiphenyl) fluoroaluminate, which is incorporated by reference herein. Combinations of activators are also contemplated, for example, alumoxanes and ionizing activators in combination are contemplated. Other activators include aluminum/boron complexes, perchlorates, periodates, iodates, including their hydrates, lithium (2,2'-bisphenyl-ditrimethylsilicate)-4T- HF and sylium salts in combination with a non-coordinating compatible anion. Also, methods of activation, such as using radiation, electro-chemical oxidation and the like are also contemplated as activating methods for the purposes of rendering the neutral metallocene-type catalyst compound or precursor to a metallocene-type cation capable of polymerizing olefins. Other activators or methods for activating a metallocene-type catalyst compound are described in, for example, U.S. Pat. Nos. 5,849,852, U.S. Pat. No. 5,859,653, U.S. Pat. No. 5,869,723 and WO 98/32775.

In general, the activator and catalyst component(s) may be combined in molar ratios of activator to catalyst component of from 1000:1 to 0.1:1 in one embodiment, from 300:1 to 1:1 in a more particular embodiment, from 150:1 to 1:1 in yet a more particular embodiment, from 50:1 to 1:1 in yet a more particular embodiment, from 10:1 to 0.5:1 in yet a more particular embodiment and from 3:1 to 0.3:1 in yet a more particular embodiment, wherein a desirable range may include any combination of any upper molar ratio limit with any lower molar ratio limit described herein. When the activator is a cyclic or oligomeric poly(hydrocarbylaluminum oxide) (e.g., "MAO"), the molar ratio of activator to catalyst component may be from 2:1 to 100,000:1 in one embodiment, from 10:1 to 10,000:1 in another embodiment and from 50:1 to 2,000:1 in a more particular embodiment. When the activator is a neutral or ionic ionizing activator, such as a boron alkyl and the ionic salt of a boron alkyl, the molar ratio of activator to catalyst component may be from 0.5:1 to 10:1 in one embodiment and from 1:1 to 5:1 in yet a more particular embodiment, for example.

More particularly, the molar ratio of Al/metallocene-metal (Al from MAO) ranges from 40 to 500 in one embodiment, from 50 to 400 in another embodiment, from 60 to 300 in yet another embodiment, from 70 to 200 in yet another embodiment, from 80 to 175 in yet another embodiment and from 90 to 125 in yet another embodiment, wherein a desirable molar ratio of Al(MAO) to metallocene-metal "M" may be any combination of any upper limit with any lower limit described herein.

In one embodiment, the heterocyclic compound described above is combined with an alkyl aluminum compound. Non-limiting examples of alkylaluminums include trimethylaluminum, triethylaluminum, triisobutylaluminum, tri-n-hexylaluminum, tri-n-octylaluminum, tri-iso-octylaluminum, triphenylaluminum and combinations thereof, for example. While often used as cocatalysts or activators, such compounds may also be used as scavengers to remove or mitigate materials, such as water and oxygen, that could otherwise interfere with the metallocene catalysts.

The activators may or may not be associated with or bound to a support, either in association with the catalyst component or separate from the catalyst component, such as described by *Gregory G. Hlatky, Heterogeneous Single-Site Catalysts for Olefin Polymerization* 100(4) CHEMICAL REVIEWS 1347–1374 (2000).

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin.

The inorganic oxides may include silica, alumina, magnesia, titania and zirconia, for example. The inorganic oxides used as support materials may have an average particle size of from 5 microns to 600 microns, or from 10 microns to 100 microns, a surface area of from 50 $m^2/g$ to 1,000 $m^2/g$, or from 100 $m^2/g$ to 400 $m^2/g$ and a pore volume of from 0.5 cc/g to 3.5 cc/g, or from 0.5 cc/g to 2 cc/g, for example.

Desirable methods for supporting metallocene ionic catalysts are known in the art and described in, for example, U.S. Pat. No. 5,643,847, which is incorporated by reference herein. The methods generally include reacting neutral anion precursors that are sufficiently strong Lewis acids with the hydroxyl reactive functionalities present on the silica surface such that the Lewis acid becomes covalently bound.

When the activator for the metallocene supported catalyst composition is a NCA, the NCA may be added to the support composition followed by the addition of the metallocene catalyst. In some processes, when the activator is MAO, the MAO and metallocene catalyst may be dissolved together in solution. The support is then contacted with the MAO/metallocene catalyst solution. In another embodiment, MAO is first reacted with silica and then a metallocene catalyst is added to form the catalyst system. Other methods and order of addition will be apparent to those skilled in the art. and are describe in, for example, U.S. Pat. No. 6,777,366 and U.S. Pat. No. 6,777,367, which are incorporated herein by reference.

Once the catalyst has been thus obtained, the polyethylene copolymers useful with the invention may be prepared using those polymerization processes that are well known in the art. Examples of such polymerization processes include but are not limited to slurry, gas-phase, and can use high or low pressures. Polymer fluff or powder produced from the polymerization reaction is removed from the reactor and may then be subjected to extrusion to produce desired pellets. Reaction conditions, including time, temperature, pressure, and residence profile, may be any known or used in the art. Agitation or mixing may be accomplished using any conventional stirring or circulating means to ensure appropriate contact between the monomers and the catalyst.

The proprietary metallocene catalyst developed by Total Petrocemicals, INC provides a polyethylene resin that desirably exhibits a large amount of long chain branches. This branching concentration provides for an enhanced shear thinning and a broad rheological breadth. As a result, it is possible to use MI lower than other similar materials with less branching and retain some processing properties. This combination of factor accounts for a high melt strength. Melt strength is desirable in blow molding and film applications.

The polyethylene copolymers useful with the invention are notably unimodal. As used herein, the term "unimodal" refers to polyethylene resins that may be characterized via a molecular weight curve that includes a single peak. Thus, the Gaussian distribution includes a single central axis relating to an average molecular weight, with all amounts except that amount corresponding to the curve's apex being lower. This is in contrast with "bimodal" and "polymodal" distributions, in which there are significant peaks at more than one graph location.

Other additives, including but not limited to oxidants, antioxidants, dyes, pigments, processing aids, fillers, fluoropolymers, combinations thereof, and the like may also be included in the composition. Such composition components may be added to the polyethylene copolymer resin either before or after processing of the polymer fluff or powder to form pellets, for example, via a conventional dry blending technique, or in alternative embodiments may be melt blended with the polymer. Those skilled in the art will be aware of the various methods known or used in the art to accomplish appropriate contact between the components and incorporation of any selected additives in the final polymer-based article.

In preparing the polyethylene compositions it is generally known that increasing the molecular weight tends to result in enhanced tensile strength, ultimate elongation, impact strength, puncture resistance and toughness of films. However, increasing the molecular weight also usually decreases processability. In the polyethylenes useful with the invention, however, the molecular weight distribution is increased and the molecular weight distribution is broadened compared to the commercial metallocene grade used by Total Petrochemicals, INC BM 359 SG. In some embodiments the weight average molecular weight, which is unimodal, of the polyethylene resin is from about 10,000 to about 1,000,000. In other embodiments it is from about 50,000 to about 200,000. In still other embodiments it is from about 80,000 to about 120,000.

The type and amount of comonomers used to prepare the copolymers useful with the invention will determine the density of the copolymer. The comonomers that may be used to prepare the copolymer, examples of comonomers used in the art are butene, hexene and octene. One of ordinary skill in the art of preparing copolymers will know how to vary the monomer feed for any particular production unit to achieve a specified density given the other properties of the copolymers disclosed herein.

The density of the polyethylene copolymers useful with the invention is, in some embodiments, desirably about 0.933±0.0015 g/cc, i.e., from about 0.9318 to about 0.9348 g/cc. In other embodiments it is desirably from about 0.930 to about 0.950 g/cc. The melt index of the polyethylene copolymers useful with the invention is, as noted hereinabove, desirable less than the melt index of Ziegler-Natta catalyzed polyethylene compositions of comparable density. In some embodiments the melt index is desirably from about 0.10 to about 0.30 dg/min using a 2.16 kg weight at 190° C., according to ASTM D1238. These conditions are commonly and hereinafter referred to as MI2. In other embodiments it is desirably from about 0.12 to about 0.30 dg/min, and in still other embodiments it is desirably from about 0.15 to about 0.30 dg/min. One desirable aspect of the polyethylene copolymers useful with the invention is their processability at a given extrusion pressure in blow molded applications. This processability may be measured, in part, by their ability to be processed at relatively comparable extrusion pressures, despite their higher molecular weight. Desirably the polyethylene resins exhibit sufficient melt strength to enable processing at the applicable extrusion pressures.

The polyethylene copolymers useful with the invention may also exhibit improved dart impact resistance according to ASTM D446 when compared with Ziegler-Natta catalyzed polyethylenes of comparable density. For example, in some embodiments the dart impact resistance for a 1 mil film extruded at 340° F. may be at least about 50 g, while at 380° F. the film may have a dart impact of at least about 60 g, and at 400° F. of at least about 100 g. For 2 mil films the dart impact may, in some embodiments, at 340° F. (171° C.) be at least about 160 g, and at 400° F. (204° C.) at least about 175 g.

Finally, gloss or haze may be a significant physical property for blown films. In general the polyethylene copolymers useful with the invention may be used to produce films that exhibit less than about 20% haze, as determined according to ASTM D1003, at a thickness of 2 mils (0.0516 mm), without the use of a clarity-enhancing agent. Articles of lesser thickness desirably exhibit even less haze, which is equivalent to higher clarity. Gloss performance may also be desirable, with some embodiments exhibiting 45° gloss readings, according to ASTM D-2457-70, ranging, in some embodiments, from 40 percent to 60 percent for a 2 mil (0.06 mm) film, and from 30 percent to 40 percent for a 1 mil (0.025 mm) film.

In one embodiment the polyethylene copolymers may have a Melt Index, known as MI2 of from 0.14 to about 0.4 dg/min. In another embodiment, the MI2 of the copolymer is from about 0.15 to about 0.3 dg/10 minutes. MI2 is determined according to ASTM D-1238 at 190° C. using a 2,160 g weight.

Examples of articles and products that may desirably be prepared using the polyethylene copolymer resins may include, in some embodiments, blown films and blow molded products. Blown films may include, for example, films used as geoliners, i.e., in-ground liners used to prevent contamination of surrounding soil and groundwater by materials found in, and leaching from, for example, trash collection and chemical dump sites. Other blown film applications include apparel bags and/or coverings, bread bags, produce bags and the like. The polyethylene copolymers may be used in a wide variety of thicknesses and as one or more layers of a multi-layer film construction. In other embodiments they may be used as coatings or may, as films, be coated or subjected to fluorination or other treatments to increase their barrier potential for these and other uses. The films are also suitable for use in or as articles designed for packaging, construction, insulation, and the like.

These films can be prepared using, for example, an Alpine Heavy Duty 50 mm extruder HS 50R/HM. This extruder has a grooved feed-throat with a maximum throughput in excess of 200 lbs/hr. Attached to the die is a single lip air ring. The air ring is attached to a blower (e.g., New York Pressure Blower Size 1806 CW UB) and a chiller run at, in some embodiments, about 40° F. The film is taken up on a variable speed winder that may be run from 0 to about 420 feet per minute. Extrusion temperatures may be from about 330 to about 500° F. (165 to 260° C.), with temperatures from 340 to 400° F. (171 to 204° C.) used in one embodiment. The film may be made with or without the use of an internal bubble stabilizer (IBS), and neck height may be varied. In general, higher neck heights tend to produce a resin with a lower permeability across a variety of melt indices. Neck heights may vary, generally up to about 10 die diameters (D), but in one embodiment neck heights from 3.3 to 7.5 D may be employed. In another embodiment a no-neck approach may be used, and may in some embodiments be particularly desirable for resins with insufficient melt strength to support a neck.

The polyethylene copolymers and compositions are also suitable for use in blow molding applications. In extrusion blow molding, a parison may be created from an extrusion head. The parison may be normally allowed to hang vertically from the extrusion head as the correct amount of parison to make the desired part may be extruded. The parison may be placed between the open portions of a blow molding mold. The blow molding mold may be then closed around the parison and the parison may be pinched off at the top and bottom. A convenient structure, typically a blow molding needle, is inserted such that a blowing gas under pressure may be introduced into the interior of the parison. The parison which at that stage may be hot and still quite flowable may be expanded outwardly by the blowing gas and the shape of the cavity in the blow mold determines the exterior configuration of the blow molded part. The blow molded part then has a wall thickness which may be substantially uniform around the dimension of the part, subject only to certain thinning of the parison as it may be stretched to meet the configuration of the mold cavity.

In blow molding using a reciprocating screw process, the polymer is accumulated in a die head or in front of the screw and subsequently shot through the die to form a parison in a short amount of time. Most metallocene polyethylenes cannot be easily used in blow molding with a reciprocating process. Either such resins have poor shear thinning and are too difficult to process, or they have too low of a melt strength and the parison does not form or inflate correctly. The polyethylene polymers useful with the invention are particularly useful as compared to other metallocene polymers as they have both high MI2s and also good melt strengths allowing them to be used in most extrusion and injection blow molding applications.

In these applications they may be used for, in various embodiments, housewares, such as food storage containers, cooking utensils (such as cups, measuring cups, strainers, turkey basters, etc.), non-food storage containers and filing cabinets, particularly clear drawers used in such cabinets, and general storage devices (such as organizers, totes, sweater boxes, etc.). Other articles and products may include rigid packaging, such as deli containers and lids (such as those used for dips, spreads, pasta salads, etc.), dairy containers and lids (such as those used for storing cottage cheese, butter, yogurt, etc.), personal care products, bags, yarns and fabrics, bottles and jars, and plates and cups. The resin may be combined with other materials, such as particulate material, including talc, calcium carbonate, and fibers, such as glass or graphite fibers, or wood to form composite materials. Examples of such composite materials include components for furniture, automotive components and building materials, particularly those used as lumber replacement. These resins may be used as a monolayer or as part of a multiplayer structure. The following examples are provided to further understanding of the described invention. As such they are intended to be, and should be construed as being, illustrative only. Those skilled in the art will understand that modifications and alterations, such as selection of specific catalysts, reaction equipment and conditions, processing equipment and conditions, additive types and amounts, and the like, may be made to the invention without departing from the scope and spirit thereof.

EXAMPLES

Example 1

A polyethylene copolymer according to the invention is prepared by polymerizing an ethylene feed in a slurry reactor in the presence of a metallocene catalyst. The MI2 range for this polymer is 0.15 to 0.30 dg/min. The density range for this polymer is 0.9315 to 0.935 g/cm$^3$. The copolymer resin is then combined with about 2000 ppm of IRGANOX™ 1010, about 1200 ppm of TINUVIN™ 622, about 200 ppm of zinc oxide, about 600 ppm of VITON™ Z100, and about 150 ppm of CARBOWAX™ PEG 300. The resulting material is commercially available under the trade designation of FINACENE® M3302.

The invention polymer is compared against a commercial blow molding material catalyzed with the same metallocene system, commercially available under the trade designation FINACENE® M3410EP, which has a MI2 of 0.9 dg/min and a density of 0.934 g/cm$^3$.

The invention polymer is also compared against a commercial blow molding material catalyzed with a chromium complex well know for its good processing properties available under the trade designation FINATHENE® 5502.

Figure 2:
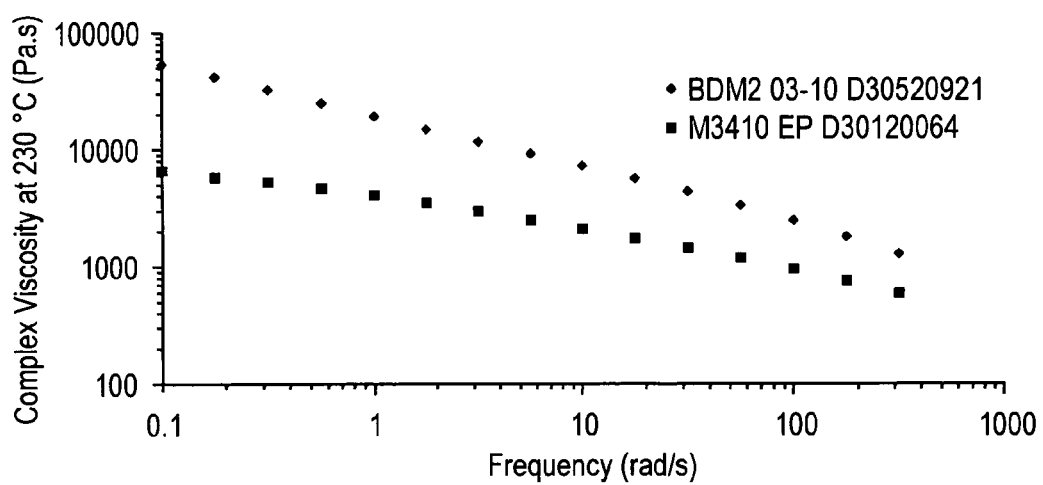
FIG. 2 is a plot of Complex Viscosity.

Table 1 details the processing conditions of the above materials on a Bekum® continuous blow molder in the forming of bottle. The M3302 and the M3410EP may be processed under the same cycle time and machine setting. The extrusion pressure is identical for both materials. Despite a lower MI2, M3302 (labeled BDM2 0310) has a broader molecular weight distribution as is shown in FIG. 1 and thus enhanced shear thinning as is shown in FIG. 2. Due to this characteristic, under the shear rates used on the Bekum®, the resulting processing pressures are identical between the two metallocene resins. A similar observation was made in a film application.

As shown in Table 1 and Table 2, the diameter swell of the metallocene materials is much lower than that of the 5502 chromium reference material. The metallocene catalyst naturally introduces a narrow molecular weight distribution, which may explain this major swell difference. M3302 also exhibits more swell than M3410 EP. This difference may be explained by a broader molecular weight distribution of the experimental material. Also, a broader rheological breadth of M3302 is not compensated by an increase in relaxation time, see, Table 3 and FIG. 3, and may contribute to slightly higher swell, although the relaxation time for these material is so short that such measurements may be outside the resolution of the measuring equipment.

TABLE 1

Bekum Processing Conditions

Bekum Blow molding Conditions

| (time in seconds) | M3302 | BM359SG | 5502 | Comments: |
|---|---|---|---|---|
| Cycle Time | 2 | 2 | 2 | |
| Mold close delay | 0.3 | 0.3 | 0.3 | M3302 Found fastest cycle time to make a good bottle. Pitted, sl. hazy, sl. Melt frac. |
| Cut delay | 0 | 0 | 0 | |
| Carriage return delay | 0.3 | 0.3 | 0.3 | |
| Blow delay | 0.18 | 0.18 | 0.18 | BM359SG Dropped in at set cond's. Had to open die gap and slow screw to maintain bottle weight of BDM 03-10. Less pitted, mod. hazy, yellowish |
| Blow interval | 8 | 8 | 8 | |
| Stop interval | 0.5 | 0.5 | 0.5 | |
| Machine control | 15 | 15 | 15 | |
| | | | | 5502 Adj. Screw speed and die gap to maintain bottle weight. Adj. parison to hook slightly to make less neck flash. White, very hazy, smooth |
| Zone 1, F/C | 350/177 | 350/177 | 350/177 | Part Data: |
| Zone 2, F/C | 360/182 | 360/182 | 360/182 | BDM2-03-10      AVG. |
| Zone 3, F/C | 360/182 | 360/182 | 380/193 | layflat-mm     43.92 |
| Gate, F/C | 370/188 | 370/188 | 400/204 | wt-gm         26.79 |
| Adaptor, F/C | 400/204 | 400/204 | 400/204 | BM359SG |
| Die, F/C | 400/204 | 400/204 | 400/204 | layflat-mm     41.36 |
| Blow air, psi/kPa | 65/244 | 65/244 | 65/244 | wt-gm         28.09 |
| Knife air, psi/kPA | 100/689 | 100/689 | 100/689 | 5502 |
| Screw amp | 8.9 | 8.5 | 8.6 | layflat-mm     50.91 |
| Screw rpm | 12.1 | 12 | 12.9 | wt-gm         27.06 |
| Screw KW | 3.2 | 2.8 | 2.8 | |
| Pressure, psi/mPa | 1750/12.07 | 1750/12.07 | 1250/0.86 | |
| Melt temp, F/C | 375/190 | 375/190 | 399/204 | |
| Mold Water temp, F/C | 90/32 | 90/32 | 86/30 | |

TABLE 2

Swell on the Uniloy Reciprocating Screw Bottle

| Resin ID | Comments | % Swell |
|---|---|---|
| 5502/D1672 | 200 g bottle (23-05-03-30) | 31.2 |
| M3302/D30520921 | 200 g bottle (23-05-03-30) | 19.5 |

TABLE 3

Rheology of M3410EP and M3302

| resin details | Eta(0) | lamda | a | Ea |
|---|---|---|---|---|
| M3410EP D30120064 | 1.07E+05 | 0.0006 | 0.1223 | 6.62 |
| BDM2 03-10 D30520921 | 4.71E+08 | 0.0006 | 0.0553 | 6.40 |

Table 4 displays the processing parameters of 5502 and M3302 materials in a Uniloy® reciprocating screw blow molder to form a bottle. Several problems had to be solved in order to process the metallocene. In particular the melt fracture was significant and the low swell did not allow the parison to fill in completely the handle of the bottle.

The melt fracture was eliminated by slowing down the screw ram speed as well as opening the die gap. These two actions reduced the shear rate in the die. Adjusting the die gap in a slightly asymmetric fashion permitted to resolve the low swell problem: A higher die opening on the opposite side of the handle enabled the parison to flow at an angle and position more material in the handle side of the mold. The cycle time, bottle weight and motor load increased significantly compared to those of the 5502 optimized conditions. The narrow molecular weight distribution of M3302 compared to 5502 results in much less shear thinning and explains the higher load on the motor.

No M3410 EP bottles could be obtained without melt fracture on the reciprocating screw blow molder. This demonstrates a processing advantage of M3302 versus the other metallocene material.

TABLE 4

Processing conditions for the Uniloy reciprocating screw

| ResinID | Bottle Wt (g) | RPM | Melt Temp, ° F./C. | Melt Press, psi/mPa | Motor Load, A | Mold Temp ° F./C. | Cycle Times | Die Gap, mm |
|---|---|---|---|---|---|---|---|---|
| 5502/D1672 Normal cond. | 121.23 | 47 | 376/191 | 2981/20.55 | 57 | 32/0 | 16.6 | 5 |

TABLE 4-continued

Processing conditions for the Uniloy reciprocating screw

| ResinID | Bottle Wt (g) | RPM | Melt Temp, °F./C. | Melt Press, psi/mPa | Motor Load, A | Mold Temp °F./C. | Cycle Times | Die Gap, mm |
|---|---|---|---|---|---|---|---|---|
| 5502/D1672 BDM cond. | 200.52 | 39 | 376/191 | 1831/12.62 | 49 | 33/1 | 31.1 | 35 |
| MM302/D30520921 | 199.38 | 30 | 380/193 | 2350/16.20 | 72 | 35/2 | 38.4 | 35 |

IV-2-Measured material properties

Table 5 exhibits the haze, transmittance and gloss of the bottles obtained by continuous extrusion. The M3302 has much lower haze and higher gloss than the M4310EP. These changes are visually noticeable on the bottles. The slightly lower density of M3302 may contribute to this phenomenon.

TABLE 5

Bottle appearance

|  | 5502 | M3410EP | M3302 |
|---|---|---|---|
| Gloss, 45 | 8.8 | 33.1 | 43 |
| Gloss, 45 Std. Dev. | 1.1 | 8.3 | 6.4 |
| Transmittance | 73.1 | 82.3 | 81.9 |
| Haze | N/A | 81 | 55.8 |

Table 6 exhibits the top load values for the materials. As expected, the unimodal material, because of a lower amount of high molecular weight fraction, displays a lower maximum load. The stiffness of the metallocene material is also lower, due to a lower density.

TABLE 6

Top load data for the bottles

|  |  | Max. Linear Load | Max. Linear Deflection (in) | Max. Load | Max. Load Deflection (in) | Apparent Stiffness |
|---|---|---|---|---|---|---|
| 5502 | AVG. | 165.53 | 0.154 | 260.5 | 0.409 | 1088.164 |
|  | ST. DEV | 11.27 | 0.020 | 4.513 | 0.020 | 84.970 |
| M3302 | AVG. | 63.33 | 0.142 | 102.3 | 0.337 | 453.333 |
|  | ST. DEV | 5.87 | 0.020 | 2.907 | 0.010 | 52.620 |

Example 2

M3302 and 3410EP are processed on an ALPINE blown film line at 75 rpm, 2.5 BUR (18.6" layflat) and three extrusion temperatures (340° F., 380° F., and 400° F.) to produce 1 and 2 mils films. An extra run is done at 400° F. to determine if the resin could be down gauged to 0.5 mils. Runs at higher neck heights were attempted at 340° F. with both materials to determine if the resin has enough melt strength as to run with a neck. A 3 BUR run was also attempted at 340° F. The 1 and 2 mils films produced at the three temperatures are tested for dart drop impact and tear resistance.

Figure 3:
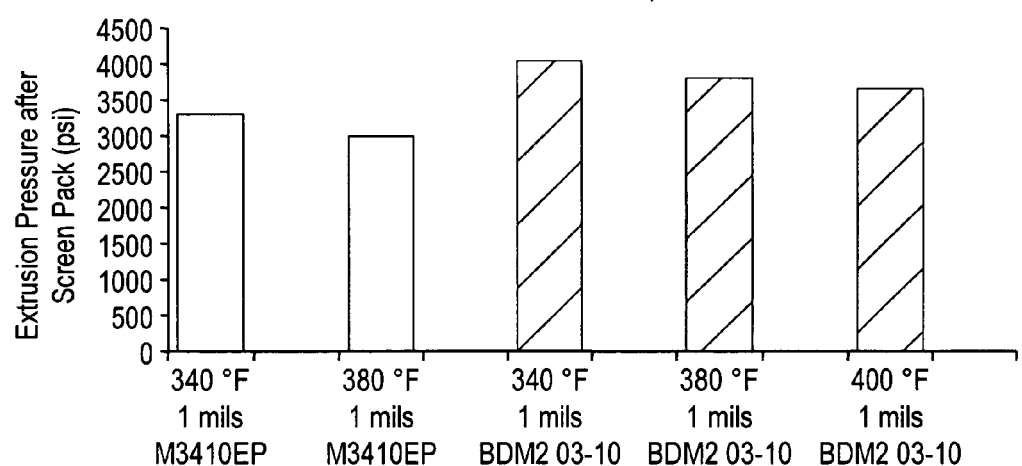
FIG. 3 is a plot of Extrusion Pressure.

At 75 rpm, 2.5 BUR, and no neck M3302 processed without difficulty on the Alpine blown film line in the range of extrusion temperatures used. FIG. 3 is a plot of the extrusion pressure after the screen pack at the conditions just mentioned. Despite the high molecular weight of M3302 compared to M3410EP, the extrusion pressure of the experimental material was only slightly lower than that of M3410 EP. This observation may be explained by the broader molecular weight distribution and more pronounced shear response of M3302. Furthermore, M3302 was able to down gauge to 0.5 mils at 400° F. Down gauging was not done at the lower extrusion temperatures.

Figure 4:
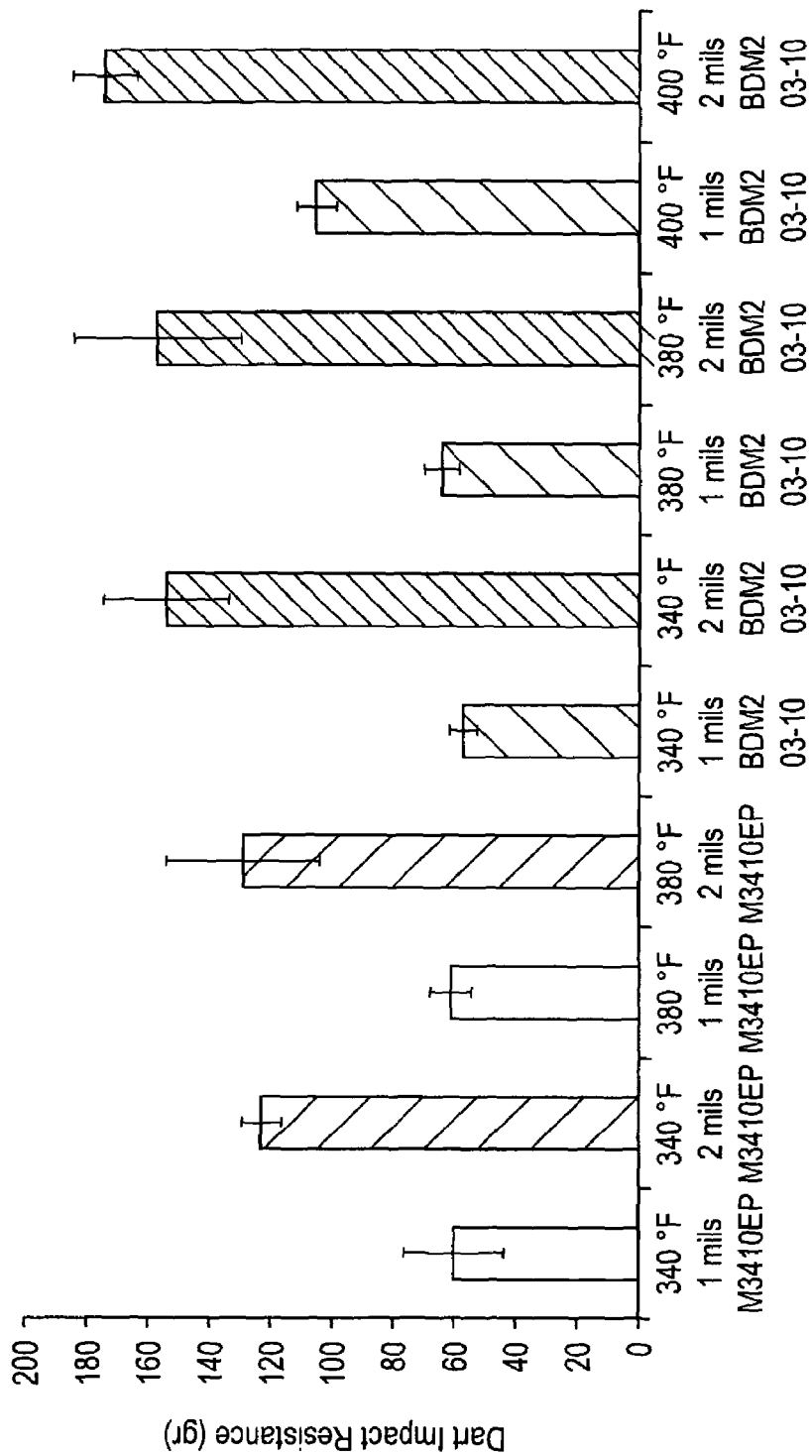
FIG. 4 is a plot of Dart Drop Impact Resistance values.

FIG. 4 presents the dart impact resistance of the 1 and 2 mils films produced on the Alpine. At 1 mil, the same dart impact was observed for M3302 and M3410 EP films while at 2 mils, M3302 films gave slightly higher dart drop impact than M3410 EP. The increase in Dart may be explained by the increase in molecular weight of the M3302 material.

Figure 5:
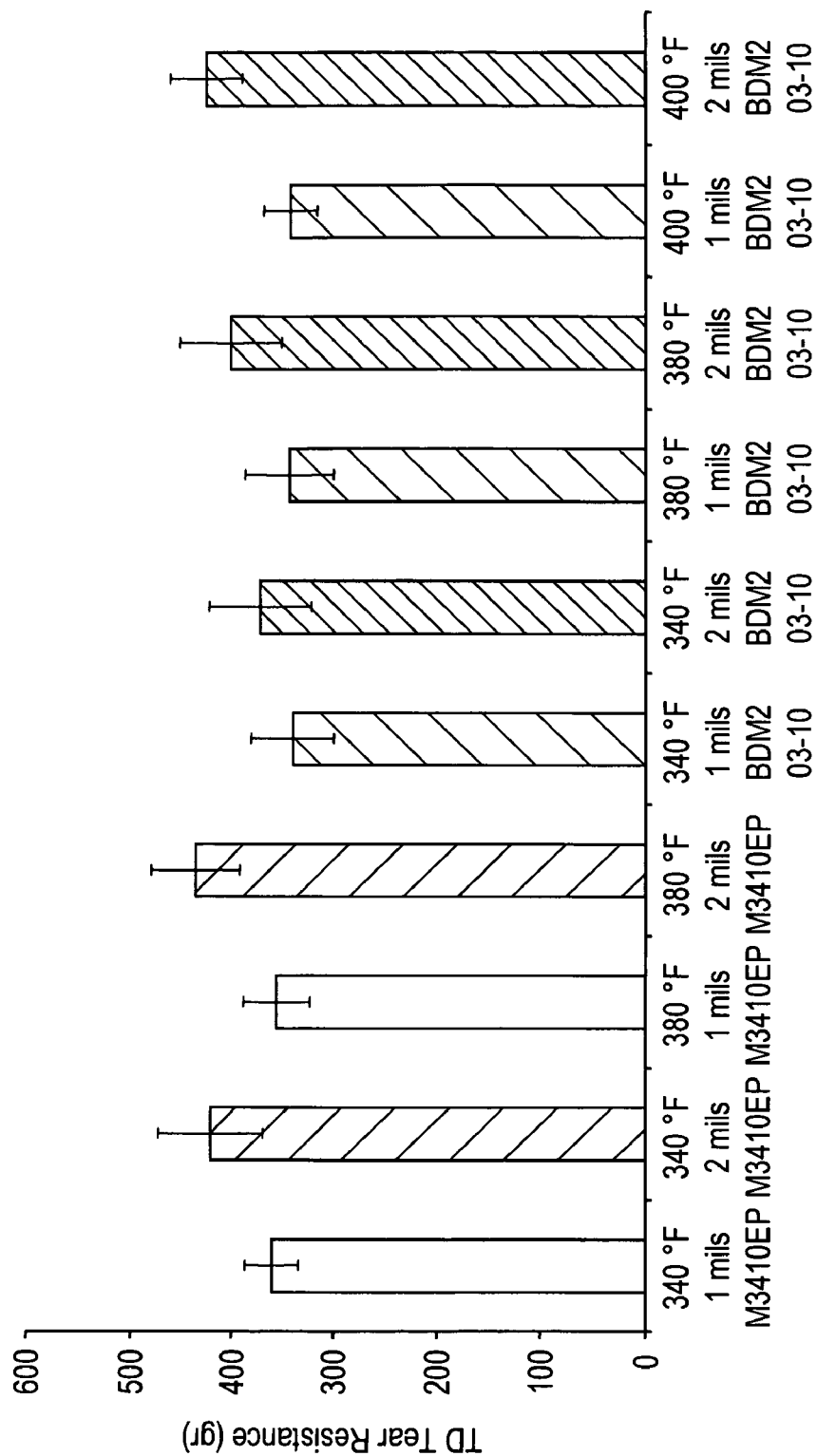
FIG. 5 is plot of Tear Resistance values.

FIG. 5 plots the transverse direction tear resistance obtained for the metallocene films produced on the Alpine. No difference in the TD tear was observed between M3410 EP and M3302 films regardless of the extrusion temperature used to produce the film. As in the case of the dart impact resistance, extrusion temperature seems to have no effect in the transverse direction tear resistance.

What is claimed is:

1. An article of manufacture comprising a blow molded object prepared using a polyethylene copolymer having a unimodal molecular weight distribution, prepared using a metallocene catalyst and having a MI2 of from about 0.10 to 0.30 dg/min, a polydispersity of at least 2.5, and a density of from about 0.930 to about 0.934 g/cc.

2. The article of claim 1 where in the blow molded object is prepared using an extrusion blow molding process.

3. The article of claim 1 where in the blow molded object is prepared using a blow molding process with a reciprocating screw.

4. The article of claim 1 wherein the polyethylene copolymer has a MI2 of from about 0.12 to about 0.3 dg/min.

5. The article of claim 4 wherein the polyethylene copolymer has a MI2 of from about 0.15 to about 0.3 dg/min.

6. The article of claim 1 wherein the polyethylene copolymer has a polydispersity of from 2.5 to 9.

7. The article of claim 1 wherein the polyethylene copolymer is prepared with a comonomer selected from the group consisting of butene, hexene, octene, and mixtures thereof.

8. The article of claim 7 wherein the polyethylene copolymer is prepared with a hexene comonomer.

9. The article of claim 1 wherein the polyethylene copolymer has a density of from about 0.9320 to about 0.9335 g/cc.

10. The article of claim 9 wherein the polyethylene copolymer has a density of from about 0.9325 to about 0.9330 g/cc.

11. The article of claim 1 wherein the polyethylene copolymer has a complex viscosity at 230° C. of from about 3,000 to about 60,000 Pa·s at a frequency of about 0.1 rad/s.

12. The article of claim 1 wherein the polyethylene copolymer has weight average molecular weight of from about 10,000 to about 1,000,000.

13. An article of manufacture comprising a blown film or a blow molded object prepared using a polyethylene copolymer having a unimodal molecular weight distribution, prepared using a metallocene catalyst and having a MI2 of from about 0.10 to 0.30 dg/min, a polydispersity of between 4 to 8, and a density of from about 0.930 to about 0.934 g/cc.

14. The article of claim 13 wherein the article comprises a blown film.

15. The article of claim 14 wherein the blown film has a haze value at a thickness of 2 mil of less than about 20 percent.

16. The article of claim 15 wherein the blown film has a haze value at a thickness of 2 mil of less than about 20 percent and the blown film is prepared using a polyethylene copolymer that does not include a clarity enhancing agent.

17. The article of claim 14 wherein the blown film has a dart impact resistance at a thickness of 1 mil and extruded at 340° F. of at least about 50 g.

18. A blow molded object prepared using a polyethylene copolymer having a unimodal molecular weight distribution, prepared using a metallocene catalyst and having a MI2 of from about 0.10 to 0.30 dg/min, a polydispersity of at least 2.5, and a density of from about 0.930 to about 0.934 g/cc; wherein the object is a bottle, jar, or food container.

19. An object comprising a blown film prepared using a polyethylene copolymer having a unimodal molecular weight distribution, prepared using a metallocene catalyst and having a MI2 of from about 0.10 to 0.30 dg/min, a polydispersity of at least 2.5, and a density of from about 0.930 to about 0.934 g/cc; wherein the object is a bread bag, apparel bag, or produce bag.

* * * * *